(12) United States Patent
    Benisty

(10) Patent No.: US 12,566,713 B2
(45) Date of Patent: Mar. 3, 2026

(54) EFFICIENT ADDRESS TRANSLATION CACHE LOOKUP OPERATIONS

(71) Applicant: Sandisk Technologies, Inc., Milpitas, CA (US)

(72) Inventor: Shay Benisty, Beer Sheva (IL)

(73) Assignee: Sandisk Technologies, Inc., Milpitas, CA (US)

(*) Notice: Subject to any disclaimer, the term of this patent is extended or adjusted under 35 U.S.C. 154(b) by 0 days.

(21) Appl. No.: 18/499,849

(22) Filed: Nov. 1, 2023

(65) Prior Publication Data

US 2025/0139013 A1 May 1, 2025

(51) Int. Cl.
    *G06F 12/10* (2016.01)
    *G06F 12/12* (2016.01)

(52) U.S. Cl.
    CPC .............. *G06F 12/10* (2013.01); *G06F 12/12* (2013.01)

(58) Field of Classification Search
    CPC ................................. G06F 12/10; G06F 12/12
    See application file for complete search history.

(56) References Cited

U.S. PATENT DOCUMENTS

| | | | | |
|---|---|---|---|---|
| 6,971,041 | B2 * | 11/2005 | DeSota | ............... G06F 12/0802 |
| | | | | 714/805 |
| 10,810,133 | B1 * | 10/2020 | Volpe | .................... G06F 12/128 |
| 10,969,992 | B2 * | 4/2021 | Gayen | ................... G06F 3/0604 |
| 2017/0090791 | A1 * | 3/2017 | Grubisic | ............. G06F 12/0864 |
| 2017/0206028 | A1 * | 7/2017 | O | ......................... G06F 12/0246 |
| 2019/0310948 | A1 * | 10/2019 | Abhishek Raja | ... G06F 12/1036 |
| 2022/0206976 | A1 | 6/2022 | Ng et al. | |
| 2023/0012648 | A1 * | 1/2023 | Fitzpatrick | ............. G11C 29/42 |
| 2023/0169013 | A1 | 6/2023 | Moon et al. | |
| 2023/0176978 | A1 | 6/2023 | Chin et al. | |
| 2023/0401160 | A1 * | 12/2023 | Huggahalli | ......... G06F 12/1081 |

* cited by examiner

*Primary Examiner* — Mark A Giardino, Jr.

(74) *Attorney, Agent, or Firm* — Patterson + Sheridan, LLP

(57) ABSTRACT

Redundancy bits can be used to more effectively manage address translation cache (ATC) in data storage devices. The data storage device maintains a table of redundancy bits. When a request for an address translation arrives, the redundancy bits are calculated and compared to redundancy bits in the table. If there is a match, then the relevant ATC entry is retrieved and compared to the untranslated addresses. The same process is repeated for each redundancy bits match until finding a match in the ATC. In so doing, the translated address can be requested much earlier than normal by requesting the translated address upon the redundancy bits not matching. The earlier retrieval reduces throughput of the memory device without reducing performance. Furthermore, the unique structure of the internal ATC allows most of the ATC to be located in SRAM/DRAM while simply the redundancy bits are stored in flops.

20 Claims, 7 Drawing Sheets

EFFICIENT ADDRESS TRANSLATION CACHE LOOKUP OPERATIONS

BACKGROUND OF THE DISCLOSURE

Field of the Disclosure

Embodiments of the present disclosure generally relate to improved address translation cache (ATC) usage.

Description of the Related Art

One of the use cases of a multi-tenancy device is where the solid-state drive (SSD) is shared across multiple tenants (i.e. virtual memories (VMs)) without any hypervisor layer between the SSD and the VM. There are a variety of optimizations around memory usage that will be done when the host operating system (OS) (e.g. Windows Server) implements page movement capabilities. The capabilities require address translation service (ATS) and Page Request Interface (PRI) functionality in any peripheral component interconnect express (PCIe) device that is directly accessed by guest VMs. Moving memory pages implies the device will receive PCIe addresses that need to be translated.

The primary driver for ATS and PRI in the drive is to get address translation cache (ATC) hits within a single 4 k input/output (IO) command. In some cases, 4 k IO commands (e.g. NVMe Write which means PCIe DMA read) will be broken up into smaller direct memory access (DMA) pieces based on the PCIe max read request size (MRRS). Generally the MRRS is 512-bytes or max 1024-bytes. For example, when a device wants to read 4 KB of contiguous data from the host, the device needs to break the request to 8 PCIe transactions while the size of each is 512-bytes. Within a single 4 k IO command, expect to get four times or eight times the reduction in ATS requests due to the drive having the ATS/ATC.

The ATC feature is very expensive since ATC requires a huge memory to be used as the cache buffer (in the order of few megabytes (MBs)) and high-performance lookup operations. ATC significantly increases the area, cost and power consumption of the device. The direct method for supporting ATS/PRI functionality is by implementing a real cache for ATC as defined in the PCIe standard. Previous approaches are inefficient and lead to expensive solutions that consume more power while having even less performance.

There is a need in the art for improved address translation.

SUMMARY OF THE DISCLOSURE

Redundancy bits can be used to more effectively manage address translation cache (ATC) in data storage devices. The data storage device maintains a table of redundancy bits. When a request for an address translation arrives, the redundancy bits are calculated and compared to redundancy bits in the table. If there is a match, then the relevant ATC entry is retrieved and compared to the untranslated addresses. The same process is repeated for each redundancy bits match until finding a match in the ATC. In so doing, the translated address can be requested much earlier than normal by requesting the translated address upon the redundancy bits not matching. The earlier retrieval reduces throughput of the memory device without reducing performance. Furthermore, the unique structure of the internal ATC allows most of the ATC to be located in SRAM/DRAM while simply the redundancy bits are stored in flops.

In one embodiment, a data storage device comprises: a memory device; and a controller coupled to the memory device, wherein the controller is configured to: data storage device comprises: a memory device; and a controller coupled to the memory device, wherein the controller is configured to: calculate one or more redundancy bits of an untranslated address; compare the one or more calculated redundancy bits to stored redundancy bits; and upon determining the one or more calculated redundancy bits matches a stored redundancy bit, retrieve an untranslated address corresponding to the matched stored redundancy bit. The one or more redundancy bits is a parity bit.

In another embodiment, a data storage device comprises: a memory device; and a controller coupled to the memory device, wherein the controller is configured to: calculate one or more redundancy bits for an untranslated address; retrieve a corresponding translated address for the untranslated address from a translation agent; update a redundancy table to include the one or more calculated redundancy bits; and update an address translation cache (ATC) with the translated address.

In another embodiment, a data storage device comprises: means to store data; and a controller coupled to the means to store data, wherein the controller is configured to: calculate and store redundancy bits in a host interface module (HIM); store untranslated addresses in the HIM; and store translated addresses in a location separate from the HIM.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Redundancy bits can be used to more effectively manage address translation cache (ATC) in data storage devices. The data storage device maintains a table of redundancy bits. When a request for an address translation arrives, the redundancy bits are calculated and compared to redundancy bits in the table. If there is a match, then the relevant ATC entry is retrieved and compared to the untranslated addresses. The same process is repeated for each redundancy bits match until finding a match in the ATC. In so doing, the translated address can be requested much earlier than normal by requesting the translated address upon the redundancy bits not matching. The earlier retrieval reduces throughput of the memory device without reducing performance. Furthermore, the unique structure of the internal ATC allows most of the ATC to be located in SRAM/DRAM while simply the redundancy bits are stored in flops.

Figure 1:
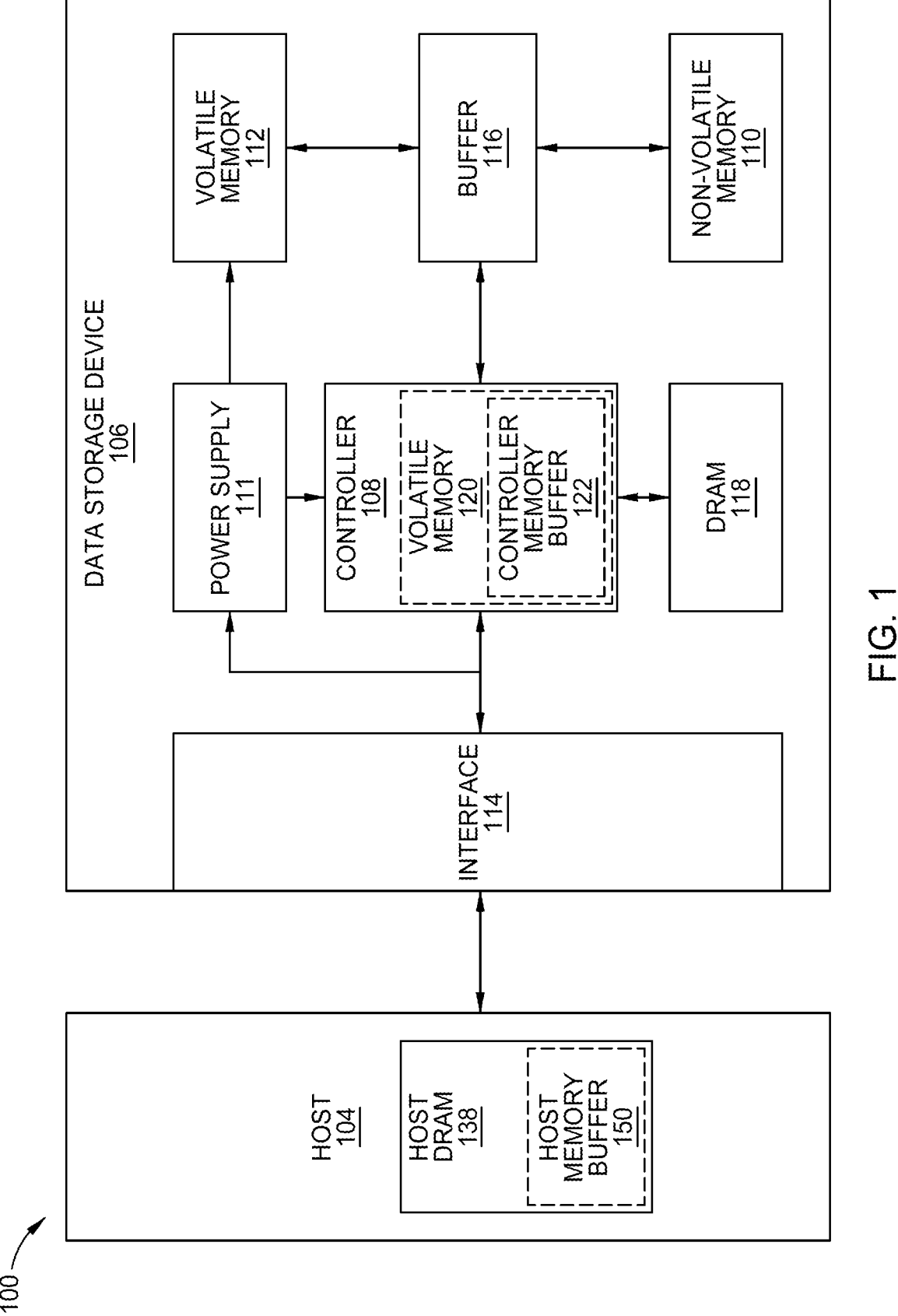
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P)

tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
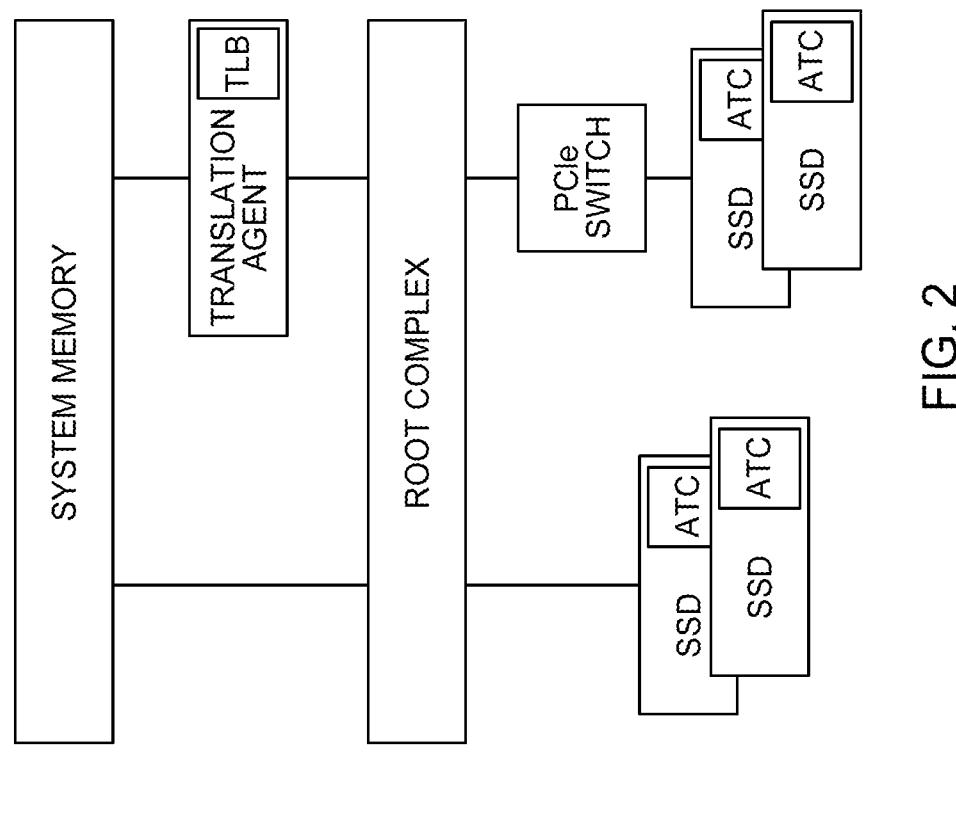
FIG. 2 is a schematic diagram illustrating a multi-tenancy system supporting ATS functionality, according to certain embodiments.

FIG. 2 is a schematic diagram illustrating a multi-tenancy system 200 supporting ATS functionality, according to certain embodiments. A translation agent (TA) services memory translation requests. Within the TA, the ATC is referred to as a translation look-aside buffer (TLB). When the ATS enabled SSD accesses system memory, the SSD shall cache translated addresses in an internal ATC. The ATC is different from the TLB translation cache used by the host. When the ATS is enabled, the SSD device shall implement and maintain a designated ATC to minimize performance dependencies on the TA and alleviate TA resource pressure.

In one embodiment, all the addresses provided over PCIe are virtual addresses that are untranslated address. Translations must be done before using the virtual addresses. The device receives the commands and then takes the PRP and all addresses provided by the host. The SSD passes the specific address request to the TA. The TA is a part of the host. The TA will receive the request and the virtual addresses from the SSD device to get translated. As a response, the SSD will receive back the translated addresses. The SSD now will be able to issue memory read and memory write requests using the translated addresses. The translated addresses will then be forwarded to the system memory.

The PCIe standard defines the ATC. The ATC is a cache buffer in the SSD. Using the cache buffer, the SSD is allowed to cache some address translation in the ATC. Whenever an SSD gets a command and then gets the PRP first, the SSD will do some lookup over the internal ATC.

Only if the SSD finds a match will the SSD use the translated address stored in the ATC. Otherwise the SSD will interact with the TLB.

Examples of PCIe addresses to be translated include: caching of submission queue (SQ) and completion queue (CQ) address ranges; SQ entry decoding including standard decoding of the data pointer for read or write that submit translation requests immediately, PRPs and SGLs that decode the data pointers and follow linked lists and upper bound of translations per large commands equal a rate match PRI translations with Gen5 bandwidth (BW) maximums, and DIX translation requests for metadata pointers and associated linked lists of addresses.

One of the challenges supporting the ATS feature is meeting performance requirements in parallel. Any PCIe memory read/write transaction that is driven by the data storage device controller must first go through the ATC and check whether the translated address is stored in ATC or not. To meet customer requirements, the ATC should hold many addresses, so that the total size of the ATC is several megabytes. The controller should search through the ATC for each and every PCIe packet to find a match. The performance of the search engine must be very high to saturate the PCIe interface and SSD performance. Additionally, the solution is not scalable since the higher the PCIe line performance, the higher required search performance.

As will be discussed herein, a scalable search scheme is needed for the ATS feature for high performance. The scheme presents a system that reduces the throughput of the memory without reducing the performance.

Figure 3:
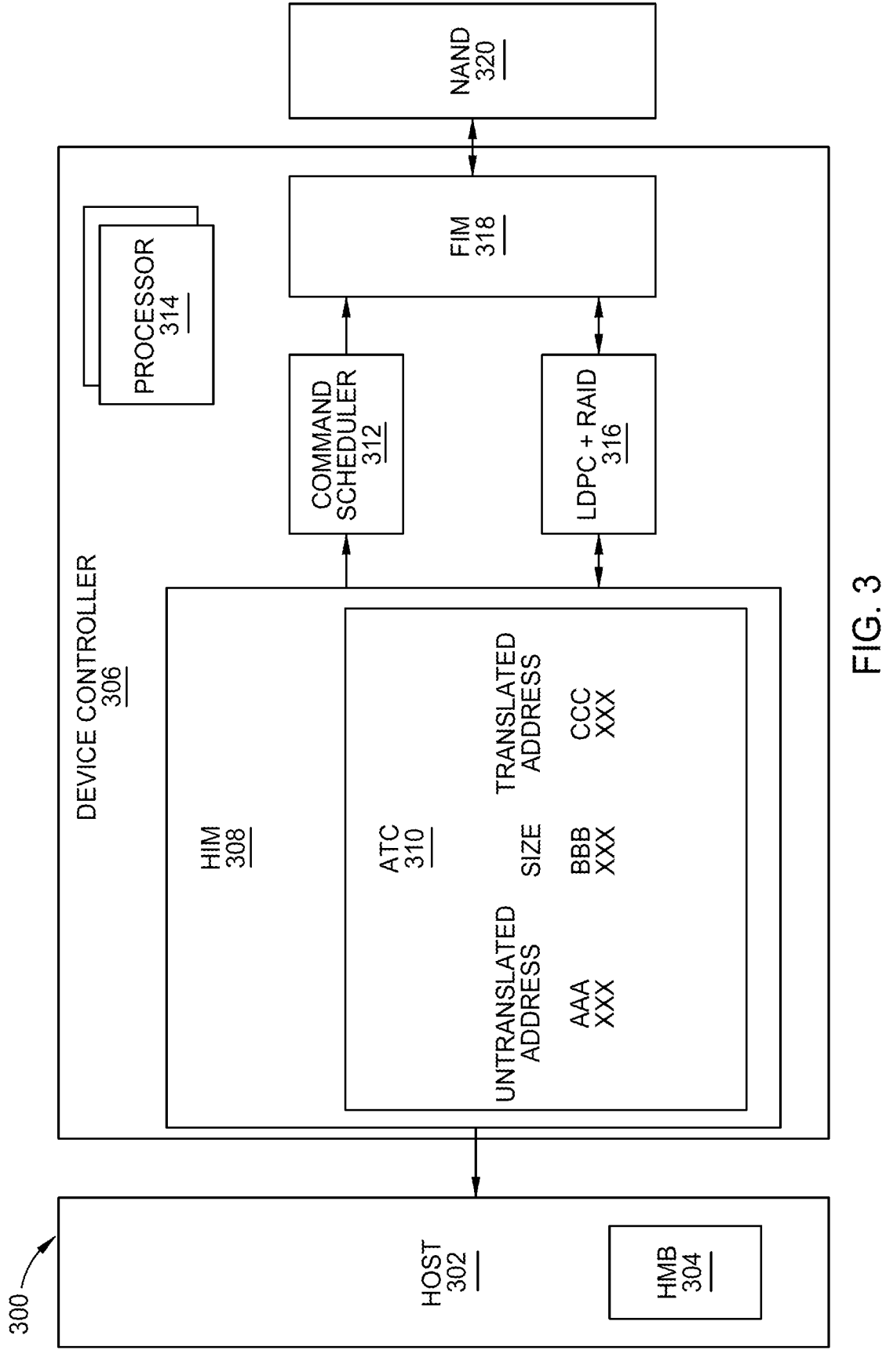
FIG. 3 is a schematic diagram illustration of an ATS memory device system, according to one embodiment.

FIG. 3 is a schematic diagram illustration of an ATS memory device system 300 that supports an ATC 310 in the device controller 306, according to certain embodiments. The ATS memory device system 300 includes a host device 302, a device controller 306, and a memory device (e.g., NAND) 320. The host device 302 includes a HMB 304. The device controller 306 includes a host interface module (HIM) 308, a command scheduler 312, a low-density parity check and redundant array of independent drives (LDPC+ RAID) component 316, a processor 314, and a flash interface module (FIM) 318. The HIM 308 includes the ATC 310.

The ATC 310 contains a table of entries (~1 MB) that hold the parameters required for caching. The parameters include untranslated addresses, size, and translated addresses. When the device controller 306 receives a request for address translation, the device controller 306 first scans the untranslated addresses stored in the ATC 310 trying to find a match. If a match is found, the corresponding translated addresses are taken from entries in the ATC 310. If a match is not found, the device controller accesses the TA in order to retrieve the address translation. The ATC 310 may be updated by removing one entry and storing a new address translation entry. The search engine performs the lookup operations and should support the PCIe line speed. The approach is quite expensive, complex, and not scalable. The approach increases the area and the cost of the device controller due to the high high-performance ATC RAM and related logic.

As will be discussed herein, one or more redundancy bits are added to untranslated addresses that are held in the ATC. The redundancy bits can be, for example, cyclic redundancy cycle (CRC), parity, or other bits. The bits will be cached in flops rather than SRAM. Whenever a new ATC request arrives, the redundancy bits of the untranslated address are calculated and compared against stored redundancy bits of other untranslated addresses. The ATC is then only accessed for entries that have a matched redundancy bit. Using the method, the number of accesses to the ATC is reduced significantly and thus, performance requirements can be met easily with reduced power. In one embodiment, the ATC is implemented in DRAM and not in SRAM. Implementing the ATC in DRAM is practical since the access rate to the ATC is lowered due to the redundancy bit algorithm. Using the method, the ATC is not implemented in SRAM anymore and the access to the ATC would be rare enough. Thus, the cost and power of the data storage device are significantly decreased.

When ATS+PRI functionality is enabled, ATS+PRI SSD devices will use the ATS to translate the address. If the translation request fails, the data storage device will use PRI to request the page. It is possible that the requested page is not resident in memory. In such a scenario, the PRI request may take a relatively long time to complete. After PRI completes, the ATS request shall be repeated to obtain the translation. After getting the translated address, the data storage device shall use that address to perform the direct memory access (DMA) operations. Overall, the fetching is less for the ATC using the embodiments disclosed herein. Therefore, there is better performance without increasing expensive storage (i.e., SRAM). The disclosure herein reduces the time to find a match of untranslated addresses in ATC.

Figure 4:
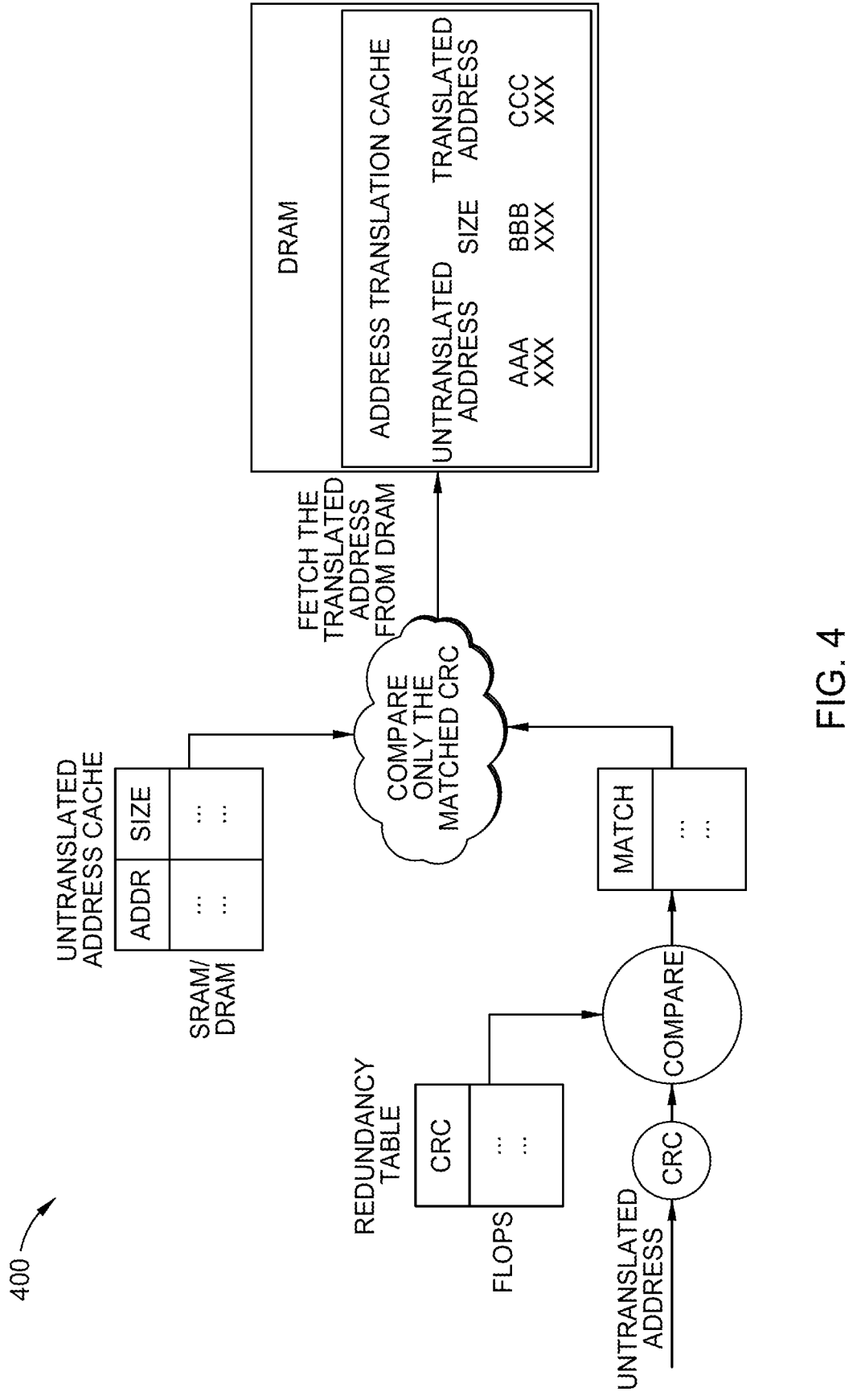
FIG. 4 is a schematic diagram illustration of using a redundancy table, according to another embodiment.

FIG. 4 is a schematic diagram illustration 400 of using a redundancy table, according to another embodiment. As shown in FIG. 4, the ATC is implemented in DRAM while the device controller holds a redundancy table in flops. The redundancy table holds CRCs (for example) of the corresponding untranslated addresses held in ATC. Whenever receiving a request to perform a lookup operation in ATC, the CRC of the new coming untranslated address is calculated and compared against all entries stored in the redundancy table. Then, the controller holds the "match" vector which is a bitmap of the CRC comparison results. Next, the logic scans the "match" vector for the matched entries, and the addresses in ATC are compared against the new coming untranslated address. If a match is found, the translated address is taken from ATC. Otherwise, the ATC does not contain this entry and the device controller should interact with the TA to obtain the translated address.

To broaden out the example of FIG. 4, initially, a request to perform a lookup operations in ATC is received. One or more redundancy bits are calculated for the corresponding untranslated address. The redundancy bits can be anywhere from a single bit to multiple bits such as 5 bits, for example. The redundancy bits can be CRC, parity, or other redundancy bit type. The calculated redundancy bit is then compared to redundancy bits that are stored in a redundancy table. The redundancy table is stored in flops. If there is a match between the calculated redundancy bit(s) and a redundancy bit(s) in the redundancy table, then there is a good possibility that the untranslated address is in the ATC. However, if there is no match, then the untranslated address is not in the ATC and the translated address can be requested from the TA. By not having a match, it is known to fetch the translated address without ever needing to access the ATC.

If the calculated redundancy bit(s) matches a bit(s) in the redundancy table, then the untranslated address is compared to a cache that contains a listing of the untranslated addresses in the ATC. If there is no match, then the translated address is fetched from the TA. If there is a match, then the untranslated address is in the ATC. Only after the second match (i.e., the match of the untranslated addresses) is the ATC accessed. The untranslated address cache may be stored in DRAM or SRAM while the ATC may be stored in DRAM or HMB. The untranslated address comparison and fetching from ATC takes some time. However, it is to be kept in mind that the first comparison (i.e., redundancy bit comparison) is fast and thus a determination that an untranslated address is not in ATC is determined much faster, and with much less power, then simply going directly to the ATC to determine if the untranslated address is present in the ATC.

In another embodiment, after the first match of the redundancy table, the controller can go directly to the ATC to find both a matching untranslated address and the corresponding size and translated address. In other words, it is contemplated that a single comparison (i.e., the redundancy comparison) can occur rather than both the redundancy comparison and the untranslated address comparison. The double comparison results in less ATC accesses and hence, better performance compared to the single comparison option and not using the redundancy table option. However, the single comparison option is still better than not using the redundancy table at all.

Figure 5:
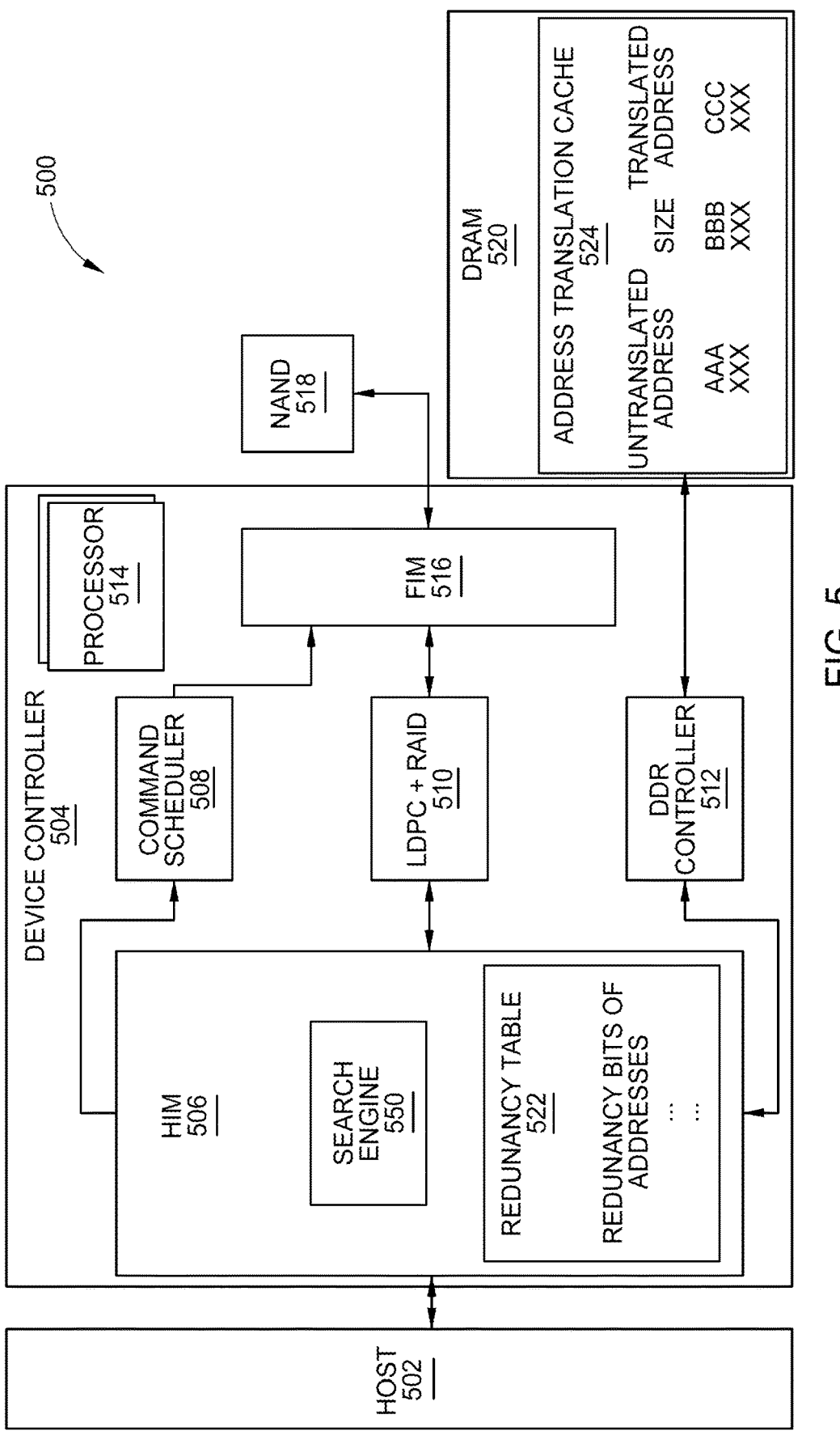
FIG. 5 is a schematic diagram illustration of an ATS memory device system, according to another embodiment.

FIG. 5 is a schematic diagram illustration of an ATS memory device system 500 where a redundancy table 522 is stored in flops in the HIM 506, according to certain embodiments. The ATS memory device system 500 includes a host device 502, a device controller 504, NAND memory 518, and external DRAM 520. The device controller 504 includes a HIM 506, a command scheduler 508, a LDPC+RAID component 510, a double data rate (DDR) controller 512, a processor 514, and a FIM 516. The HIM 506 contains the redundancy table 522. The external DRAM 520 contains the second part of the ATC 524.

The redundancy table 522 holds the redundancy bits. The untranslated addresses, and their sizes, can be stored elsewhere such as HMB or DRAM or SRAM. The ATC 524 holds the corresponding translated addresses, untranslated addresses, and size, and the ATC may be implemented in external DRAM 520.

The controller 504 incorporates a search engine 550 which utilizes the redundancy table 522 in order to reduce the access rate to the ATC 524 implemented in DRAM 520. The redundancy table 522 should be small enough to reduce the area of the table. However, the redundancy table 522 should not be so small to reduce the access rate to the ATC 524 significantly.

TABLE

| Parameter | 0-bit (no redundancy table) | 1-bit (parity) | 2-bit | 3-bit | 4-bit | 5-bit |
|---|---|---|---|---|---|---|
| Worst case access to ATC | 1024 | 512 | 256 | 128 | 64 | 32 |
| Total size of redundancy table | 0 | 128 bytes | 256 bytes | 384 bytes | 512 bytes | 640 bytes |

The Table above shows the trade-off when selecting the bit width of the redundancy bits (e.g., CRC) and redundancy table. The assumption in the Table is that 1024 entries are held in ATC and therefore 1024 CRC entries are needed. The higher the bit width, the higher the area of the redundancy table and the lower access rate to ATC. Generally speaking, a single redundancy bit or multiple redundancy bits are contemplated to be added to the untranslated address. It is contemplated that the bit width shown in the Table is not fixed, but rather, can be changed dynamically based upon a hit rate (i.e., accuracy of the comparison with the redundancy table).

Figure 6:
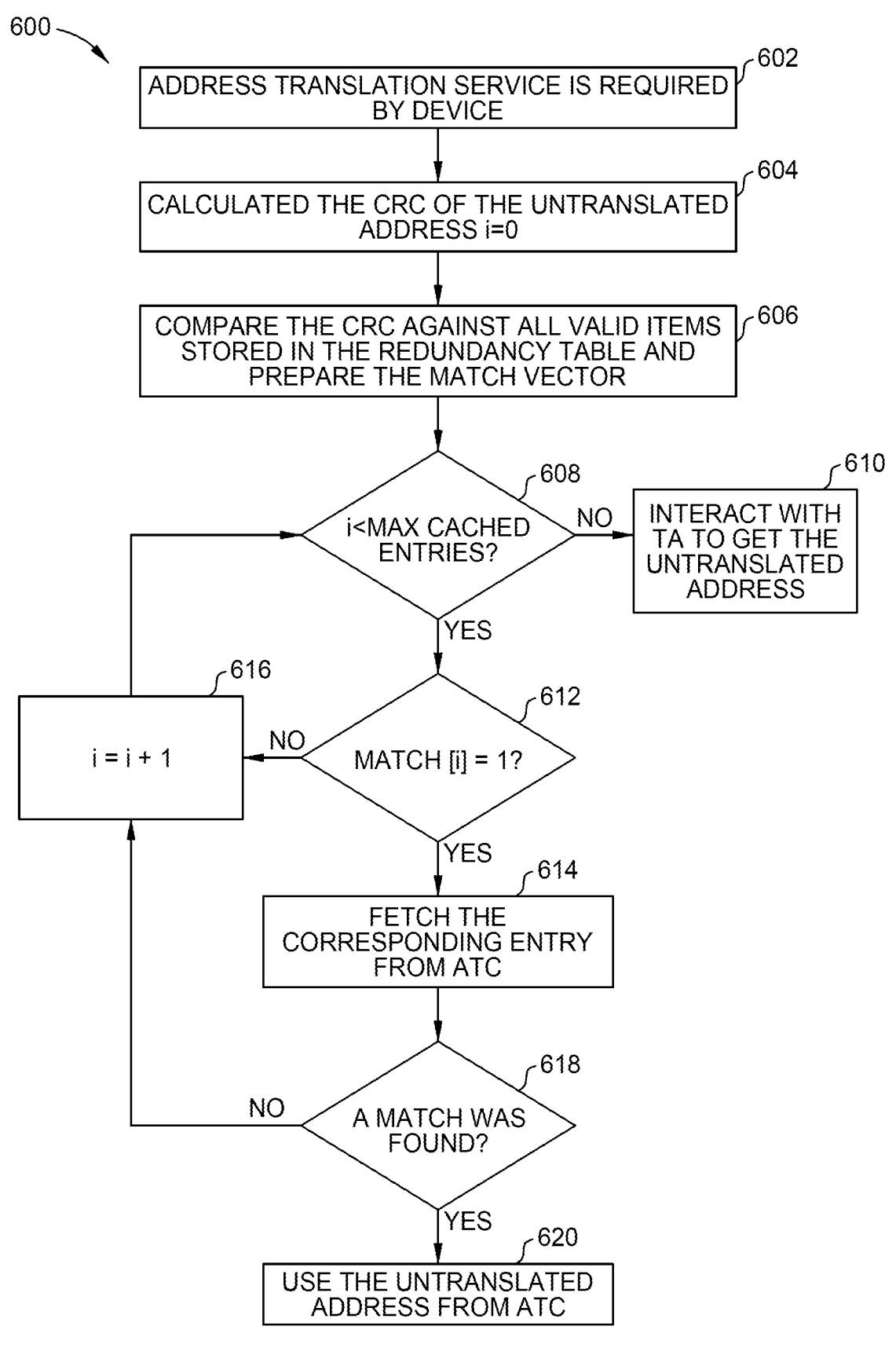
FIG. 6 is a flowchart illustrating a process of using redundancy bits, according to one embodiment.

FIG. 6 is a flowchart 600 illustrating a process of using redundancy bits, according to one embodiment. The flowchart 600 illustrates the flow for an ATC lookup while using a redundancy table. Initially, a determination is made that address translation service is required by the data storage device at 602. Then, the redundancy bit (e.g., CRC) of the incoming untranslated address is calculated at 604 and "i" is set to 0 ("i" being a counter). The calculated redundancy bit (e.g., CRC) is compared against all valid entries held in the redundancy table in 606. The "match" vector is calculated while each bit indicates the comparison results with the associated entry. The logic scans the vector, and the ATC is accessed only for the entries that had the same redundancy bit (e.g., CRC) value. Using the technique, the access rate to the ATC is significantly reduced.

After the comparison at 606, a determination is made at 608 regarding whether "i" is less than the maximum cached entries. If "i" is not less than the maximum cached entries, then the data storage device reaches out to the TA to obtain the untranslated address at 610. However, if "i" is less than the maximum cached entries, then a determination is made regarding whether "i" equals 1 at 612. If "i" equals 1, then the corresponding untranslated address is fetched at 614. If "i" does not equal 1, then "i" is increased by 1 at 616. The fetched untranslated address is compared to the untranslated address with the calculated redundancy bits at 618. If there is no match, then the method returns to 616, but if there is a match, then the untranslated address is in the ATC, and the translated address is fetched at 620.

Figure 7:
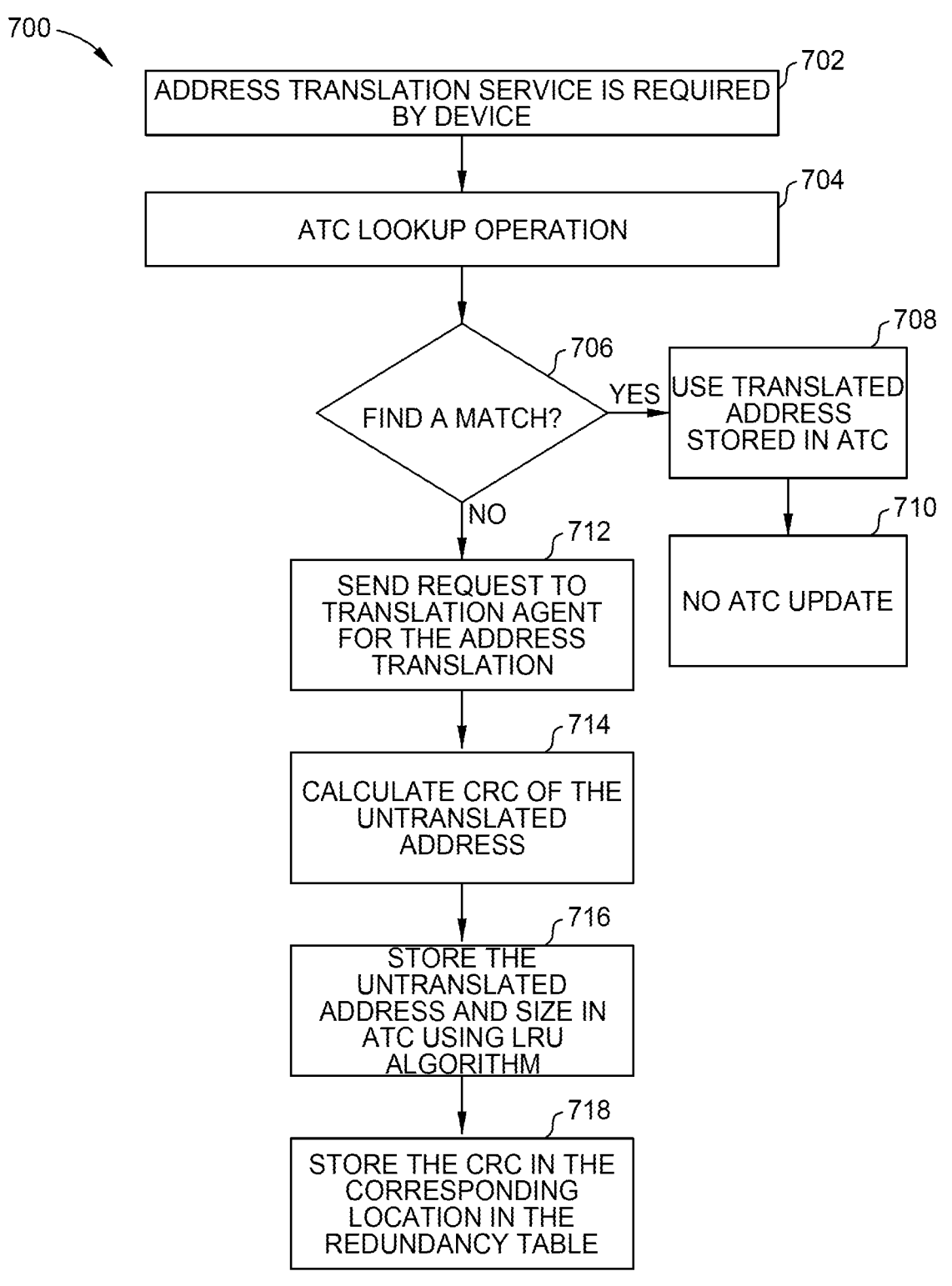
FIG. 7 is a flowchart illustrating a process adding redundancy bits to a table, according to one embodiment.

FIG. 7 is a flowchart 700 illustrating a process adding redundancy bits to a table, according to one embodiment. In the case of an ATC miss, the new untranslated address ends up stored in ATC while evicting one entry from the ATC (assuming the ATC is full). The corresponding entry is in the redundancy table is replaced with the new calculated redundancy bit.

More specifically, a determination is made at 702 that an address translation service is needed by the data storage device. At 704, the ATC lookup operation occurs, such as shown in FIG. 6 and discussed above. If there is a match at 706, then the translated address stored in the ATC is used in 708 and there is no need to update the ATC at 710. However, if there is no match at 706, then a request is sent to the TA at 712 to obtain address translation of the untranslated address. The redundancy bit of the untranslated address is calculated at 714. The untranslated address, size, and translated address are then stored in the ATC using a least recently used algorithm at 716. Finally, the calculated redundancy bit is stored in the corresponding location of the redundancy table at 718.

By using a redundancy bit table, efficient ATC usage is scalable and does not depend on a host interface speed. The solution can work even when the host interface speed is doubled. The use of the redundancy table is a low power solution compared to multiple accesses to the ATC and the activation in a very high clock frequency.

In one embodiment, a data storage device comprises: a memory device; and a controller coupled to the memory device, wherein the controller is configured to: data storage device comprises: a memory device; and a controller coupled to the memory device, wherein the controller is configured to: calculate one or more redundancy bits of an untranslated address; compare the one or more calculated redundancy bits to stored redundancy bits; and upon determining the one or more calculated redundancy bits matches a stored redundancy bit, retrieve an untranslated address corresponding to the matched stored redundancy bit. The one or more redundancy bits is a parity bit. The one or more redundancy bits are cyclic redundancy check (CRC) bits. The controller is configured to determine whether the retrieved untranslated address corresponding to the matched stored redundancy bit matches the untranslated address. Upon determining that the retrieved untranslated address corresponding to the matched stored redundancy bit matches the untranslated address, retrieve a corresponding translated address. The stored redundancy bits are stored in flops. The flops are stored in a host interface module (HIM). The retrieved untranslated address is stored in static random access memory (SRAM). A translated address corresponding to retrieved untranslated address is stored in dynamic random access memory (DRAM). The controller is further configured to: upon determining the one or more calculated redundancy bits does not match a stored redundancy bit: retrieve an untranslated address corresponding to the matched stored redundancy bit from a translation agent; and store the one or more calculated redundancy bits. The controller is configured to dynamically adjust a bit width of the one or more redundancy bits. The adjusting is in response to a hit rate of the comparing.

In another embodiment, a data storage device comprises: a memory device; and a controller coupled to the memory device, wherein the controller is configured to: calculate one or more redundancy bits for an untranslated address; retrieve a corresponding translated address for the untranslated address from a translation agent; update a redundancy table to include the one or more calculated redundancy bits; and update an address translation cache (ATC) with the translated address. The controller is configured to evict one or more second redundancy bits from the redundancy table. The evicting is based upon a least recently used (LRU) algorithm. The controller is further configured to determine whether the calculated one or more redundancy bits match one or more redundancy bits stored in the redundancy table. The controller comprises a search engine configured to perform the calculating and for comparing the calculated one or more redundancy bits to one or more redundancy bits in the redundancy table.

In another embodiment, a data storage device comprises: means to store data; and a controller coupled to the means to store data, wherein the controller is configured to: calculate and store redundancy bits in a host interface module (HIM); store untranslated addresses in the HIM; and store translated addresses in a location separate from the HIM. The location separate from the HIM is a host memory buffer (HMB). The controller is configured to evict redundancy bits from the HIM.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
calculate one or more redundancy bits of an untranslated address;
compare the one or more calculated redundancy bits to stored redundancy bits;

upon determining the one or more calculated redundancy bits matches a stored redundancy bit, retrieve an untranslated address corresponding to the matched stored redundancy bit; and
dynamically adjust a bit width of the one or more redundancy bits.

2. The data storage device of claim 1, wherein the one or more redundancy bits is a parity bit.

3. The data storage device of claim 1, wherein the one or more redundancy bits are cyclic redundancy check (CRC) bits.

4. The data storage device of claim 1, wherein the controller is configured to determine whether the retrieved untranslated address corresponding to the matched stored redundancy bit matches the untranslated address.

5. The data storage device of claim 4, upon determining that the retrieved untranslated address corresponding to the matched stored redundancy bit matches the untranslated address, retrieve a corresponding translated address.

6. The data storage device of claim 1, wherein the stored redundancy bits are stored in flops.

7. The data storage device of claim 6, wherein the flops are stored in a host interface module (HIM).

8. The data storage device of claim 7, wherein the retrieved untranslated address is stored in static random access memory (SRAM).

9. The data storage device of claim 8, wherein a translated address corresponding to retrieved untranslated address is stored in dynamic random access memory (DRAM).

10. The data storage device of claim 1, wherein the controller is further configured to:
upon determining the one or more calculated redundancy bits does not match a stored redundancy bit:
retrieve an untranslated address corresponding to the matched stored redundancy bit from a translation agent; and
store the one or more calculated redundancy bits.

11. The data storage device of claim 1, wherein the adjusting is in response to a hit rate of the comparing.

12. The data storage device of claim 1, wherein the controller is configured to evict one or more second redundancy bits from a redundancy table.

13. A data storage device, comprising:
a memory device; and
a controller coupled to the memory device, wherein the controller is configured to:
calculate one or more redundancy bits for an untranslated address;
compare the one or more calculated redundancy bits to stored redundancy bits;
upon determining the one or more calculated redundancy bits matches a stored redundancy bit, retrieve an untranslated address corresponding to the matched stored redundancy bit;
retrieve a corresponding translated address for the untranslated address from a translation agent;
update a redundancy table to include the one or more calculated redundancy bits;
update an address translation cache (ATC) with the translated address; and
dynamically adjust a bit width of the one or more redundancy bits.

14. The data storage device of claim 13, wherein the controller is configured to evict one or more second redundancy bits from the redundancy table.

15. The data storage device of claim 14, wherein the evicting is based upon a least recently used (LRU) algorithm.

16. The data storage device of claim 13, wherein the controller is further configured to determine whether the calculated one or more redundancy bits match one or more redundancy bits stored in the redundancy table.

17. The data storage device of claim 13, wherein the controller comprises a search engine configured to perform the calculating and for comparing the calculated one or more redundancy bits to one or more redundancy bits in the redundancy table.

18. A data storage device, comprising:

means to store data; and a controller coupled to the means to store data, wherein the controller is configured to:

calculate one or more redundancy bits of an untranslated address;

compare the one or more calculated redundancy bits to stored redundancy bits;

upon determining the one or more calculated redundancy bits matches a stored redundancy bit, retrieve an untranslated address corresponding to the matched stored redundancy bit;

store untranslated addresses in a host interface module (HIM);

store translated addresses in a location separate from the HIM; and dynamically adjust a bit width of at least one of the redundancy bits.

19. The data storage device of claim 18, wherein the location separate from the HIM is a host memory buffer (HMB).

20. The data storage device of claim 18, wherein the controller is configured to evict redundancy bits from the HIM.

* * * * *